United States Patent [19]

Ransom, II

[11] Patent Number: 5,368,192
[45] Date of Patent: Nov. 29, 1994

[54] FOOD PELLET DISPENSING APPARATUS

[75] Inventor: Leland B. Ransom, II, Comfort, Tex.

[73] Assignee: Sweeney Enterprises, Inc., Boerne, Tex.

[21] Appl. No.: 53,454

[22] Filed: Apr. 27, 1993

[51] Int. Cl.⁵ .......................................... B65G 59/00
[52] U.S. Cl. ............................ 221/277; 239/687; 119/57.91
[58] Field of Search ............... 239/687, 689, 668, 70; 221/277, 290, 12, 13, 15; 119/51.11, 57.91, 51.12, 51.01; 222/650, 643, 639

[56] References Cited

U.S. PATENT DOCUMENTS

| | | | |
|---|---|---|---|
| 1,239,404 | 9/1917 | Knoll, Jr. | 119/57.91 |
| 2,538,413 | 1/1951 | Chard | 222/650 |
| 3,443,763 | 5/1969 | Wolford | 239/668 |
| 3,993,225 | 11/1976 | Manni | 239/687 |
| 4,166,581 | 9/1979 | Hetrick | 239/687 |
| 5,143,289 | 9/1992 | Gresham et al. | 239/687 |

*Primary Examiner*—Kenneth W. Noland
*Attorney, Agent, or Firm*—Donald R. Comuzzi; Christopher L. Makay

[57] ABSTRACT

The food pellet dispensing apparatus of the present invention includes a hopper which communicates food pellets to a paddle wheel, which is housed within an enclosure, through a chute. The paddle wheel is coupled to a drive motor which rotates the paddle wheel when power is applied. Positioned within the chute is a shut-off gate that controls the flow of food pellets from the hopper into the enclosure. A timer circuit applies power to the drive motor at periodic intervals to facilitate the rotation of the paddle wheel. A delay timer circuit after a predetermined delay, which approximately corresponds to the time required to accelerate the paddle wheel to operating speed, opens the shut-off gate, thereby allowing food pellets to gravity feed from the hopper to the enclosure. As the food pellets enter the enclosure, they are accelerated by the paddle wheel until an outlet in the enclosure is reached. When the food pellets reach the enclosure outlet, they are propelled by the paddle wheel from the apparatus and out along the desired food pellet scatter area.

6 Claims, 3 Drawing Sheets

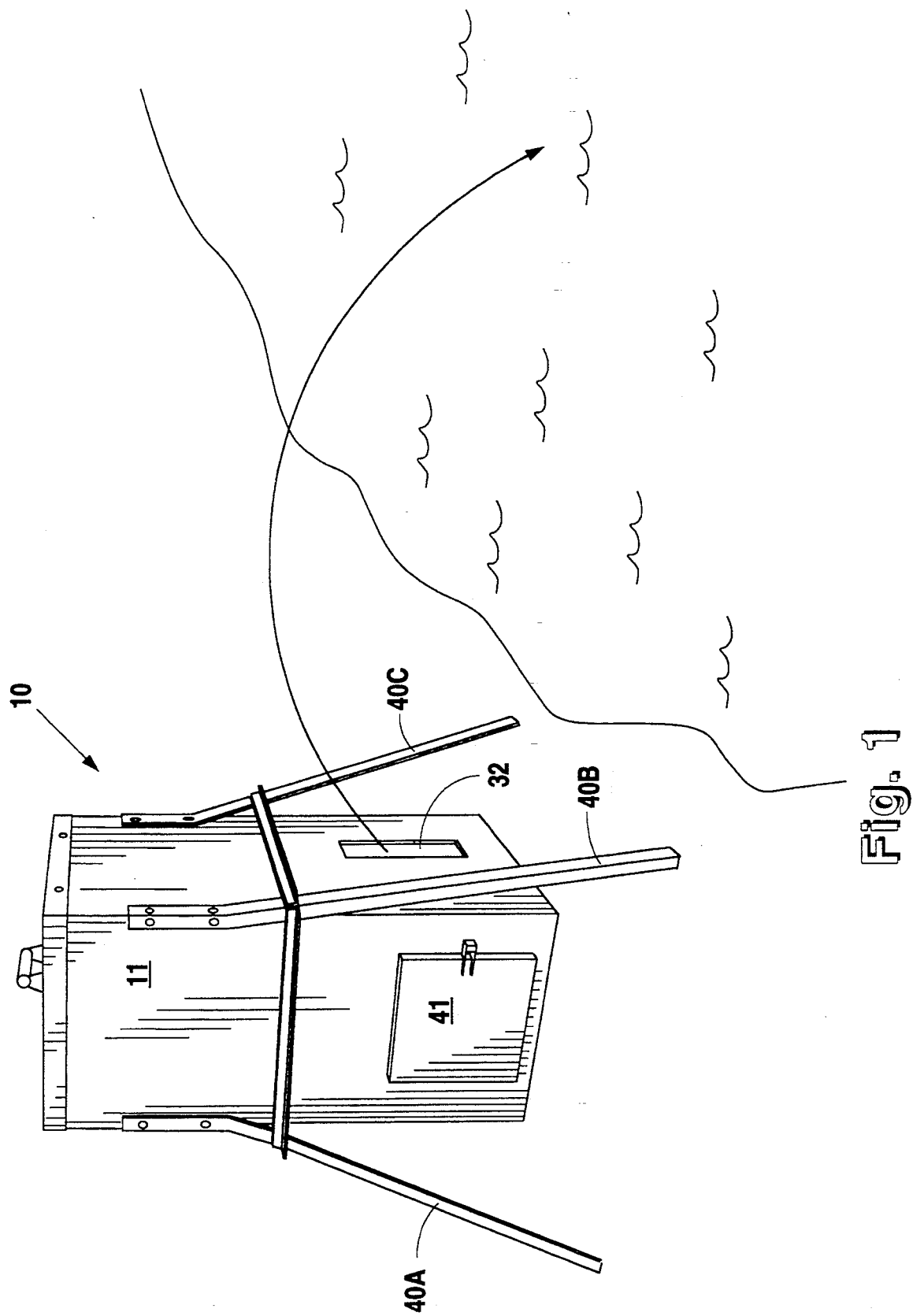

FOOD PELLET DISPENSING APPARATUS

BACKGROUND OF THE INVENTION

1. Field the Invention

The present invention relates to feeding apparatus and, more particularly, but not by way of limitation, to an apparatus which dispenses food pellets unidirectionally over a fixed area on a predetermined feeding schedule.

2. Description of the Related Art

Feeding apparatus utilized to dispense food pellets over a fixed area on a predetermined feeding schedule are typically scatter-type feeders. Such feeders consist of a hopper positioned over a motor-driven scatter plate. The hopper includes a funnel which directs food pellets stored in the hopper directly onto the scatter plate as it rotated circularly by the drive motor. Scatter-type feeders further include a timer circuit which controls the periodic activation of the scatter plate drive motor as well as the delivery of food pellets to the scatter plate as it rotates. In operation, when the time between feeding intervals expires, the timer circuit activates the scatter plate drive motor which, in turn, rotates the scatter plate circularly. Concurrently, food pellet flow from the hopper onto the scatter plate begins. As the food pellets strike the scatter plate, they are accelerated by the rotation of the scatter plate and propelled away from the feeder. Thus, food pellets are spread about the ground or into a body of water so that the particular animal being fed may retrieve the food pellets.

Although scatter type feeders function adequately to spread food pellets about a fixed feeding area, in certain feeding situations they are impractical and difficult to operate. For example, scatter-type feeders are not easily adaptable for use in dispensing food pellets into a body of water. Specifically, scatter-type feeders distribute the food pellets anywhere from 180° to 360° about the hopper. If a scatter-type feeder were merely placed along the shore of a body of water, a large portion of the food pellets would not be propelled into the water but rather only propelled along the shore. Not only is this situation wasteful of food pellets, but also food pellets along the shore will attract unwanted animals such as raccoons, skunks, and opossums. Scatter-type feeders, therefore, must be positioned over the body of water if they are to be used efficiently with a minimum of nuisance animal attraction. Unfortunately, typical installation of scatter-type feeders over bodies of water creates unnecessary logistical problems.

Typical installations include dock mounted feeders, boom mounted feeders, cable mounted feeders, and float mounted feeders. Although the different installation methods reduce or eliminate the scattering of food pellets along the shore, each is difficult to implement and maintain. For dock mounting, a hole must be cut in the dock so that the scatter plate will reside above the water but below the dock. Dock mounting of feeders is undesirable because the feeders occupy valuable dock space, especially, if they are mounted at the end of the dock. Both boom and cable mounted feeders require time intensive installment. Posts must be set into the ground in concrete, and in the case of cable mounting, a cable and pulley system is required to maneuver the feeder from the shore to over the water and back. Finally, when scatter type feeders are floated out in the body of water, maintenance and refilling of the hopper becomes a difficult task. The floated feeder must either be pulled to shore or a boat used to travel to it. In either case, significant time is wasted. Accordingly, scatter-type feeders are impractical for use in delivering food pellets into a body of water.

Additionally, scatter type feeders often fail to impart sufficient force to the food pellets to propel them an adequate distance from the hopper. The above situation especially occurs during the initial starting and stopping of the rotation of the scatter plate. For instance, when the scatter plate begins and stops rotation, the slow speed with which it is travelling provides insufficient force to propel the food pellets away from the hopper. In such a situation, the food pellets, having little applied force, merely accumulate around and underneath the hopper. This is especially true when using battery powered devices with low voltage batteries. Battery powered feeders are commonly used because of the inaccessibility of other sources of power at remote locations on a lake shoreline. As a result, the animals to be fed often cannot reach them or in a worst case scenario, the animals knock over the feeder in an attempt to reach the food pellets.

The present invention, therefore, solves the above problems by providing a food pellet dispensing apparatus powered by low voltage batteries and which is configured to propel the food pellets unidirectionally over a fixed area with sufficient force to ensure that no food pellet accumulation about and underneath the food pellet dispensing apparatus occurs.

SUMMARY OF THE INVENTION

The fish food dispensing apparatus of the present invention includes a hopper which feeds into a food pellet dispensing unit. The food pellet dispensing unit includes a motor driven paddle wheel mounted within an enclosure. The food pellet dispensing unit further includes an improved chute which allows delivery of food pellets from the hopper to the enclosure. The chute is equipped with three baffles, a plate and a shut-off gate. Two of the baffles are provided to reduce the weight and frictional forces applied to the shut-off gate by the food pellets contained in the hopper. The third baffle functions as a "sweep" for the shut-off gate and further functions to prevent the shut-off gate from binding when it closes. The opening and closing of the shut-off gate controls the starting and stopping of food pellet flow from the hopper. The plate is provided to direct the food pellets into the food pellet dispensing unit housing.

The paddle wheel of the food pellet dispensing unit is configured to propel the pellets unidirectionally from the food pellet dispensing apparatus. Additionally, the paddle wheel continually imparts a force to the food pellets sufficient to ensure they are expelled at a rate which prevents them from accumulating about the food pellet dispensing apparatus. To accomplish that, the shut-off gate of the chute is not opened until after the paddle wheel has been accelerated to its operating speed by the drive motor. By delaying the opening of the shut-off gate, the food pellets contact the paddle wheel while it is traveling at or near full operating speed. Furthermore, after the shut-off gate is closed, the back voltage of the paddle wheel drive motor is used to sustain the paddle wheel rotating. Sustaining the paddle wheel rotating for a brief time period after removal of power ensures all the food pellets below the shut-off gate are propelled out of the food pellet dispensing unit. Thus, the food pellets are always propelled at or near full force from the food pellet dispensing unit, resulting in no accumulation of food pellets about or underneath the food pellet dispensing apparatus.

Another advantage of the paddle wheel is that the food pellets are accelerated from the food pellet dispensing unit in a single direction, thereby allowing the use of the food pellet dispensing apparatus when food pellets are to be dispensed from the shore of a body of water.

It is, therefore, an object of the present invention to provide a food pellet dispensing apparatus that dispenses food pellets unidirectionally.

It is another object of the present invention to provide a food pellet dispensing apparatus which ensures food pellets do not accumulate about and underneath the apparatus.

It is a further object of the present invention to provide a food pellet dispensing apparatus with a motor driven paddle wheel which propels the food pellets unidirectionally through an opening in the food pellet dispensing apparatus housing.

It is a further object of the present invention to provide the food pellet dispensing apparatus with a shut-off gate which is opened by a timer delay circuit after the paddle wheel has been accelerated to operating speed by its drive motor.

Still other objects, features, and advantages of the present invention will become apparent to those of ordinary skill in the art in light of the following.

BRIEF DESCRIPTION OF THE DRAWINGS

FIG. 1 is a perspective view depicting the food pellet dispensing apparatus according to the preferred embodiment of the present invention configured to dispense fish food pellets into a body of water.

DETAILED DESCRIPTION OF THE PREFERRED EMBODIMENT

Figure 3:
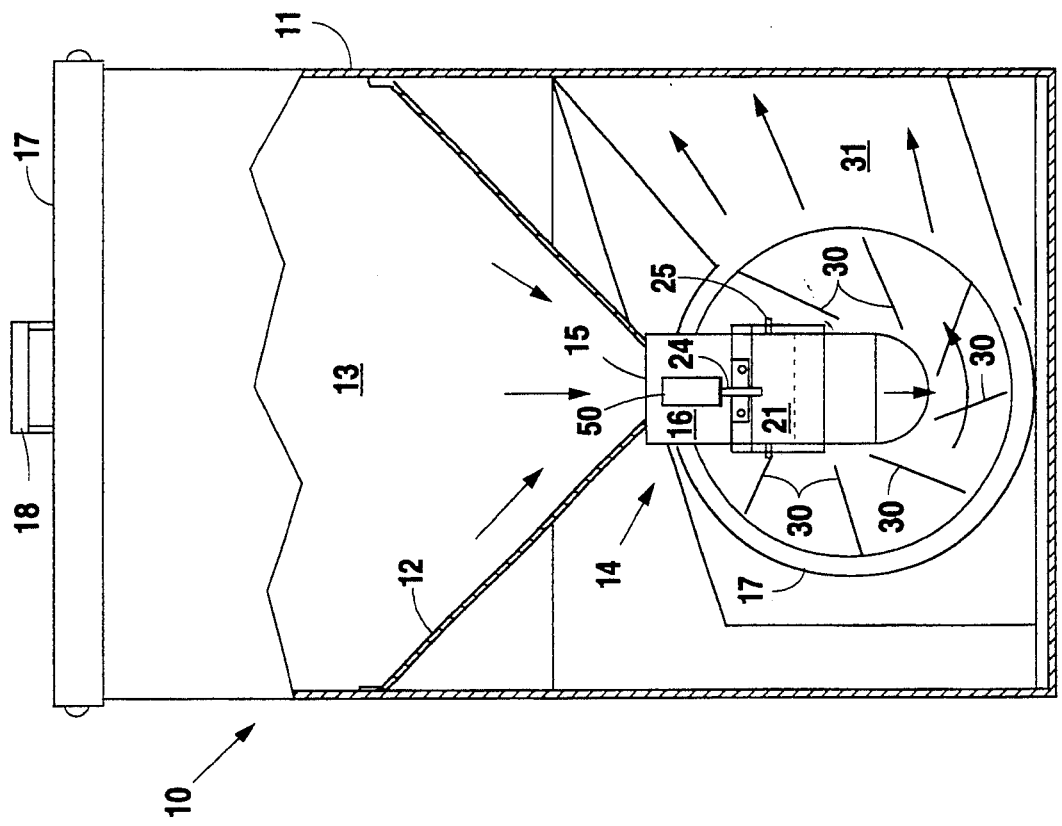
FIG. 3 is a partial cut-a-way side view depicting the food pellet dispensing apparatus according to the preferred embodiment of the present invention.
Figure 2:
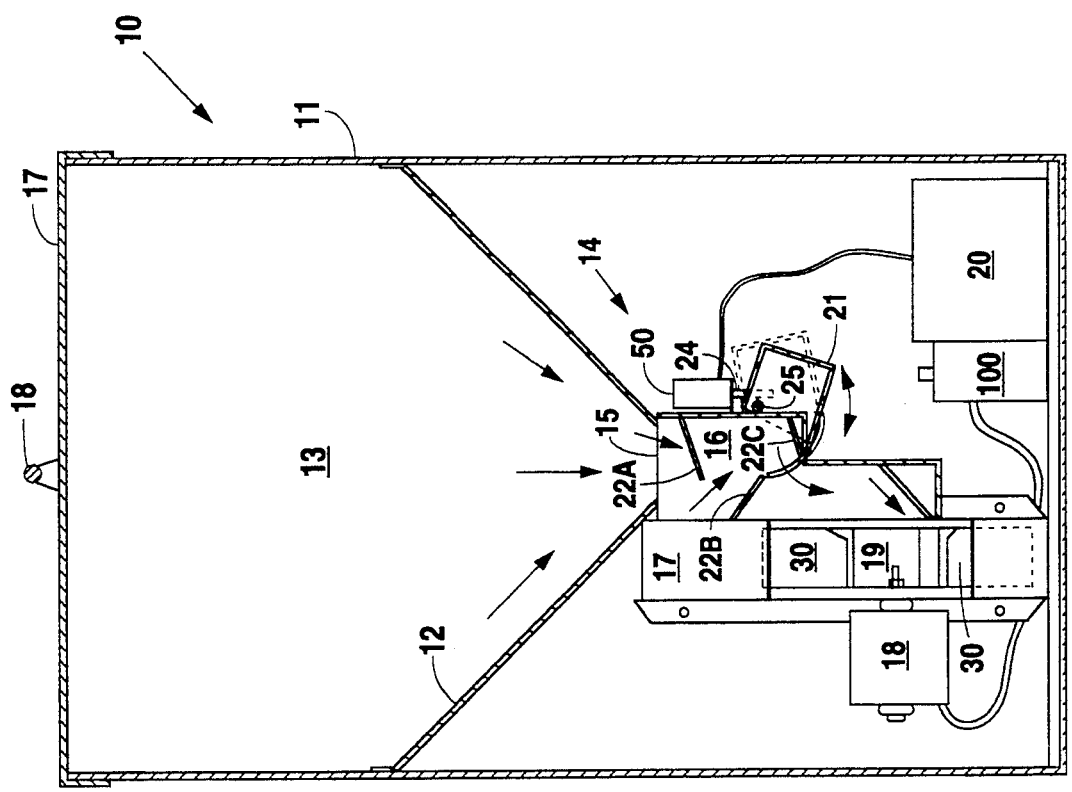
FIG. 2 is a cut-a-way front view depicting the food pellet dispensing apparatus according to the preferred embodiment of the present invention.

Referring to FIGS. 2 and 3, food pellet dispenser 10 includes housing 11 which is formed from four generally rectangular-shaped walls integrally connected and, further, connected at their lower end to a bottom. The lower portion of housing 11 contains pellet dispensing unit 14 while the portion of housing 11 directly above pellet dispensing unit 14 is provided with funnel 12 which forms hopper 13 in the upper portion of housing 11. Funnel 12 is constructed of four integrally formed side-walls which are mounted at their upper ends to the inside walls of housing 11 using any suitable means such as welding and, further, are formed at their lower ends with an opening 15 which connects hopper 13 to chute 16 of pellet dispensing unit 14. Hopper 13 stores the food pellets to be dispensed and, additionally, gravity feeds the food pellets to pellet dispensing unit 14. Housing 11 is also equipped with lid 17 having handle 18, which facilitates easy removal of lid 17. Lid 17 functions to allow access to hopper 13 to permit filling of hopper 13 with food pellets. Lid 17 also serves as a cover to protect the food pellets stored in hopper 13 from foraging animals as well as the elements.

Chute 16 is mounted on enclosure 17 of pellet dispensing unit 14 and communicates with the inside of enclosure 17 to deliver food pellets from hopper 13 for dispensing from pellet dispensing unit 14. Chute 16 is equipped with three baffles 22A-C, shut-off gate 21, and plate 23. Baffles 22A and B are mounted at different levels on opposing sides of chute 16 immediately below hopper 13 to reduce the weight and frictional force applied against shut-off gate 21 by the feed pellets. By installing baffles 22A and B within chute 16, shut-off gate 21 may be opened with a low current drain solenoid (described herein with reference to FIG. 4) and closed using only gravity. If baffles 22A and B were not employed, shut-off gate 21 could not be operated within the power limits required by feed pellet dispensing unit 14 (approximately one ampere per hour). Baffle 22C is placed within chute 16 in close proximity to lip 26 of shut-off gate 21 and functions to "sweep" food pellets off shut-off gate 21 as it opens. Baffle 22C further prevents binding of shut-off gate 21 as it closes. Without baffle 22C, the food pellets that accumulate on shut-off gate 21 when it is closed, might jam it shut, or the flow of food pellets during dispensing might jam shut-off gate 21 open. Plate 23 is provided to direct the feed pellets into the inside of enclosure 17.

Figure 4:
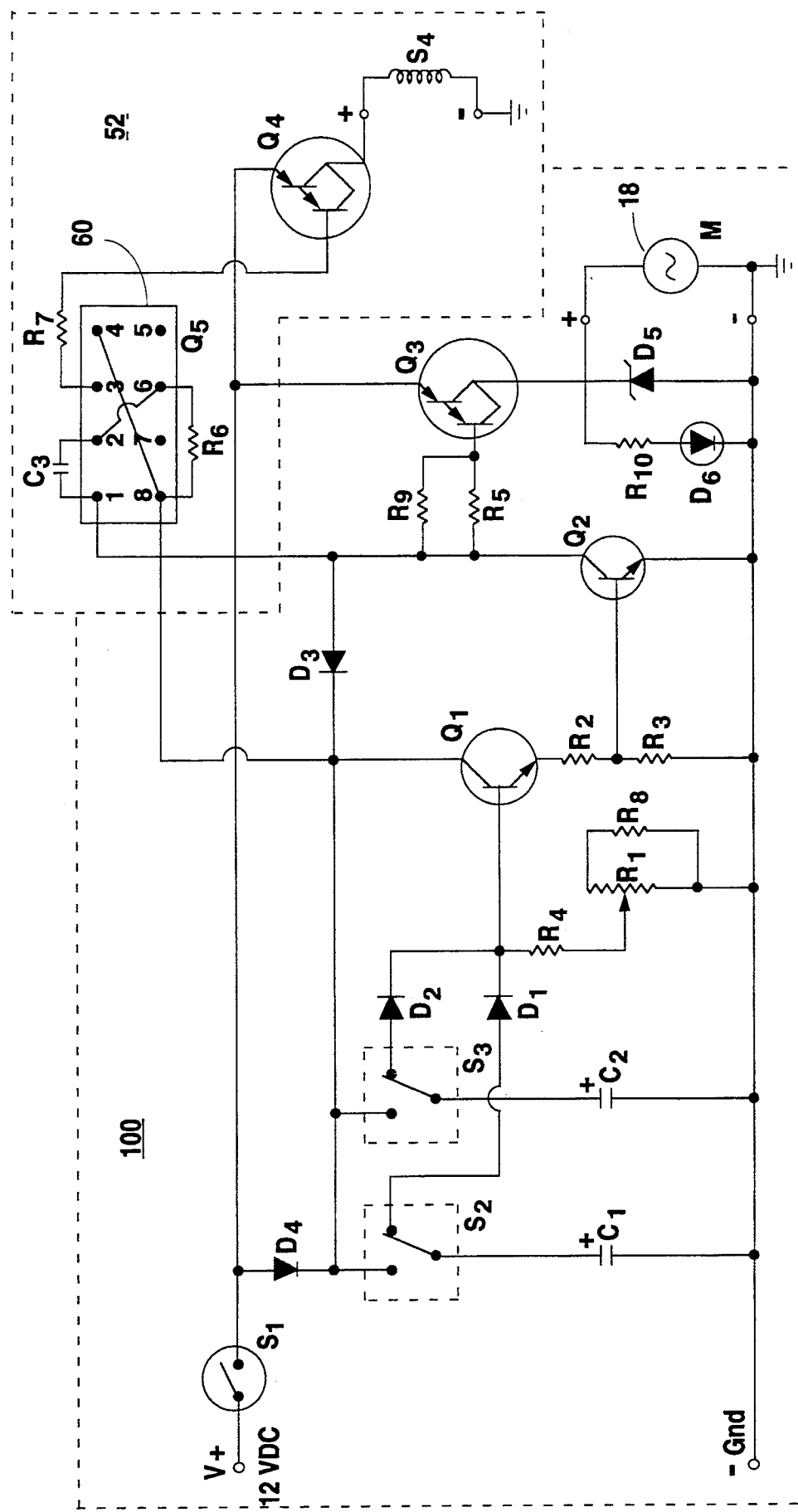
FIG. 4 is a schematic diagram depicting the preferred embodiment of the drive motor timer circuit and the delay timer circuit for the shut-off gate.

The opening and closing of shut-off gate 21 is performed by solenoid 50 under control of timer delay circuit 52 (described herein with reference to FIG. 4). Power to operate the opening of solenoid 50 under control of timer delay circuit 52 is supplied by battery 20. Shut-off gate 21 is pivotally connected to chute 16 using pivot pin 25 inserted through holes in shut-off gate 21 and a hinge (not shown) connected to the outside of chute 16. When actuated, solenoid 50 pulls shut-off gate 21 to the position shown in outline in FIG. 2 utilizing rod 24. With shut-off gate 21 open, food pellets gravity feed into enclosure 17 of food pellet dispensing unit 14. When solenoid 50 is deactivated, shut-off gate 21 returns to its closed position by gravity. The positioning of shut-off gate 21 on chute 16 permits lip 26 of shut-off gate 21 to raise vertically toward baffle 22B during closing of shut-off gate 21. Raising lip 26 vertically toward baffle 22B induces bridging of the flow of food pellets from hopper 13 in the horizontal plane rather than the vertical plane, where there is a weight penalty. That is, because the food pellets are travelling horizontally after striking baffle 22C, lip 26 of shut-off gate 21 does not experience the full weight of the food pellets, and therefore, shut-off gate 21 can be closed without binding using only the force of gravity. The closing of shut-off gate 21 employing gravity is necessary so that reliable shut-off of food pellet flow may be achieved within the power limits of food pellet dispensing unit 14 as previously described.

Mounted on the side of enclosure 17 opposite from chute 16 is motor 18, which drives paddle wheel 19 to facilitate the dispensing of food pellets. In addition to supplying power to solenoid 50 via timer delay circuit 50, battery 20 supplies power to motor 18 via timer circuit 100 (described herein with reference to FIG. 4). Paddle wheel 19 is secured to the drive shaft of motor 18 using a nut (see FIG. 2). Paddle wheel 19 is constructed with a plurality of blades denoted generally in FIG. 3 as numeral 30. The inside of enclosure 17 is circular in shape so that blades 30 reside in close proximity to the inside walls (see FIG. 3). However, the top of enclosure 17 is provided with a space so that air trapped between blades 30 as they rotate will be released into the space. Without the space, the trapped air would cause substantial air resistance, thereby resulting in reduced paddle wheel operating speed and diminished apparatus performance. Additionally, enclosure 17 is provided with passageway 31 which serves an outlet for the food pellets during dispensing.

The activation of motor 18 by timer circuit 100 (described herein with reference to FIG. 4) starts paddle wheel 19 turning. When shut-off gate 21 opens, food pellets are delivered into enclosure 17 where the rotation of paddle wheel 19 launches the food pellets into passageway 31 and out opening 32 in housing 11 (see FIG. 1). Specifically, each of blades 30 scoops some of the entering food pellets and accelerates the pellets along the inside walls of enclosure 17 until passageway 31 is reached. When the accelerated food pellets reach passageway 31, their inertia carries them into passageway 31 and out opening 32 into the fixed area where food pellet dispensing is desired.

Referring to FIG. 4, timer circuit 100 and timer delay circuit 52 will be described. Timer circuit 100 is a Sweeney Enterprises, Inc. Model DFT1-Q timer. Although the description of timer delay circuit 52 is done in conjunction with timer circuit 100, one of ordinary skill in the art will readily recognize that other periodic timers may be substituted for timer circuit 100. Timer circuit 100 is connected to battery 20 and functions to periodically turn on and supply power to motor 18. Switch S1 is a manual switch utilized to activate timer circuit 100. Switch S3 is connected to a quartz clock (not shown), which is programmed to activate switch S3 at periodic intervals. When the quartz clock activates S3, switch S3 momentarily changes position allowing capacitor C2 to charge via diode D4. After capacitor C2 is charged, switch S3 returns to the position shown in FIG. 4, resulting in the discharge of capacitor C2 into the base of transistor Q1 through diode D2. The resistor network of potentiometer R1 and resistors R4 and R8 is supplied to determine the length of time capacitor C2 biases transistor Q1 on. In other words, the resistance of that network as set by potentiometer R1 determines the length of time power will be delivered to motor 18. The turning on of transistor Q1 electrically connects timer circuit 100 with battery 20. Current flows from battery 20 through both diode D4 and transistor Q1 into the base of transistor Q2, thus turning it on. Resistors R2 and R3 connect transistor Q1 to ground and, further, function to limit the current and voltage delivered to the base of transistor Q2. With transistors Q1 and Q2 activated, power from battery 20 will be delivered to turn on motor 18 and open shut-off gate 21 (described herein).

Delay timer circuit 52 operates to delay the opening of shut-off gate 21 until after motor 18 has been started. It includes monostable one-shot timer 60, which in the preferred embodiment is a Motorola 555 timer. Power to monostable one-shot timer 60 is applied at pin 8, while pin 1 serves as the ground pin. Pins 2, 3, 4, and 6 are the trigger, output, reset, and threshold pins, respectively. Pins 5 and 7 are wired either high or low or are left unconnected because they are unnecessary. Diode D3 is provided between pins 8 and 1 to prevent voltage spikes from damaging monostable one-shot timer 60. To make a 555 timer function as a monostable one-shot timer, pin 8 must be connected to pin 4, and pin 2 must be connected to pin 6. With transistor Q2 turned off, pins 8 and 1 are at the same potential (approximately 12 volts) and, therefore, monostable one-shot timer 60 is off. When monostable one-shot timer 60 is off, the output from pin 3 is high (approximately 12 volts) resulting in transistor Q4 being turned off. That is, the base and emitter of transistor Q4 are at the same potential and, therefore, no current can flow through transistor Q4. Similarly, the base and emitter of transistor Q3 are at the same potential (approximately 12 volts) as a result of monostable one-shot timer 60 and transistor Q2 being turned off. Thus, no current can flow through transistor Q3 either. In the preferred embodiment, transistors Q3 and Q4 are PNP Darlington solid state switches.

However, when transistor Q2 is turned on, pin 1 is connected to ground potential, resulting in the activation of monostable one-shot timer 60 and current flow through transistor Q2. current flow through transistor Q2 reduces the potential seen at the base of transistor Q3, thus allowing current to flow from the base of transistor Q3 via resistors R9 and R5. Accordingly, transistor Q3 is turned on. The activation of transistor Q3 connects motor 18 to battery 20, resulting in voltage and current being delivered to motor 18, thereby starting it. With motor 18 energized, paddle wheel 19 rotates to propel food pellets from food pellet dispensing unit 14 until motor 18 is deenergized. LED D6 is connected to battery 20 via transistor Q3 and resistor R10 and lights during the energization period of motor 18 to show motor 18 is running. Zener diode D5 is provided as a protective diode to prevent back voltage spikes from motor 18 from damaging either timer circuit 100 or delay timer circuit 50.

With paddle wheel 19 rotating, food pellets from hopper 13 must be delivered to food pellet dispensing unit 14. However, the opening of shut-off gate 21 must be delayed until motor 18 reaches operating speed (approximately 1500 rpm). If food pellets were delivered to food pellet dispensing unit 14 before motor 18 reached operating speed, paddle wheel 19 might become jammed with food pellets and stop rotating, thus causing damage to motor 18. Delay timer circuit 52, therefore, is provided to delay the opening of shut-off gate 21. As described above, when transistor Q2 is biased on, pin 1 goes to ground potential while pin 8 remains at the potential of battery 20. As a result, monostable one-shot timer 60 is activated. After monostable one-shot timer 60 times out, the output at pin 3 goes low. The length of the delay time period produced from monostable one-shot timer 60 is dependent upon the RC network formed by capacitor C3, which is connected between pins 1 and 2, and resistor R6, which is connected between pins 8 and 6. In the preferred embodiment, capacitor C3 and resistor R6 produce a delay of approximately 2.4 seconds between the activation of monostable one shot timer 60 and the change in the output from pin 3. After pin 3 goes low, the potential seen at the base of transistor Q4 is reduced, thus allowing current to flow from the base of transistor Q3 via resistor R7. Accordingly, transistor Q4 is turned on. The activation of transistor Q3 connects solenoid S4 to battery 20, resulting in voltage and current being delivered to solenoid S4, thus actuating it. Solenoid 50 pulls shut-off gate 21 open via rod 24, thereby permitting food pellets to be delivered from hopper 13 to food pellet dispensing unit 14.

Shut-off gate 21 remains open and motor 18 remains on until capacitor C2 discharges. After capacitor C2 discharges, transistor Q1 and, therefore, transistor Q2 are turned off. With transistor Q2 off, pins 8 and 1 of monostable one-shot timer 60 again return to the same potential. As a result, pin 3 returns to a high output causing transistor Q4 to shut off. Solenoid 50 is deactuated and shut-off gate 21 closes as previously described to stop the flow of food pellets. With pins 8 and 1 at the same potential, transistor Q3 also turns off. However, because motor 18 is an inductive load, timer circuit 100 is not immediately shut off when transistor Q3 is turned off. Instead, motor 18 acts briefly as a generator to provide a back voltage that energizes timer circuit 100, resulting in power being sustained to paddle wheel 19 for a small time period after transistor Q3 turns off. That additional power functions to sustain paddle wheel operation for a brief time period so that any food pellets below shut-off gate 21 will be dispensed from the food pellet dispensing unit 14. If paddle wheel 19 were not rotated briefly at a speed high enough to dispense the food pellets away from the dispensing unit, the food pellets would accumulate too near to housing 11, producing the same problem experienced by scatter-type feeders. Additionally, any food pellets remaining in food pellet dispensing unit 14 might prevent the rotation of paddle wheel 19 on subsequent start-ups, causing damage to motor 18.

Switch S2 is a manually activated switch utilized in conjunction with capacitor C1 to provide operator activation of motor 18 and shut-off gate 21. Once switch S2 has been pressed and released, capacitor C1, which will have received a charge as described above with reference to capacitor C2, discharges through diode D1 into the base of transistor Q1, thus turning it on. Timer circuit 100 and timer delay circuit 52 will then operate to start and run motor 18 and open and close shut-off gate 21 as previously described.

Referring to FIG. 1, an application of food pellet dispenser 10 will be described. Housing 11 is fitted with feet 40A–C and a fourth foot (not shown) to hold housing 11 in a stable position. Housing 11 is further provided with door 41 which is utilized to provide easy operator access to food pellet dispensing unit 14 for servicing. Food pellet dispenser 10 is placed along the shore of a body of water, and the quartz clock which activates timer circuit 100 and delay timer circuit 52 is programmed. When timer circuit 100 and delay timer circuit 52 are activated, motor 18 is turned on and shut-off gate 21 is opened. As a result, food pellet dispensing unit 14 propels the food pellets delivered from hopper 13 into the body of water as shown. Food pellet dispensing unit 14 propels the food pellets sufficiently away from housing 11 so that there is little or no accumulation of the food pellets along the shore. Additionally, because power to paddle wheel 19 is sustained for a brief period after power is removed from motor 18 and solenoid 50, any food pellets remaining below shut-off gate 21 will also be propelled sufficiently away from housing 11 so that there will be little or no accumulation of food pellets along the shore.

Although the present invention has been described in conjunction with the foregoing specific embodiment, many alternatives, variations and modifications should be apparent to those of ordinary skill in the art. Those alternatives, variations, and modifications are intended to fall within the spirit and scope of the appended claims.

I claim:

1. A pellet dispensing apparatus, comprising:
   a paddle wheel mounted within an enclosure, said enclosure having an outlet;
   a drive means for rotating said paddle wheel within said enclosure;
   a chute;
   a hopper communicating with said enclosure through said chute;
   a gate pivotally connected to said chute; and
   a solenoid connected to said gate, wherein the activation of said solenoid opens said gate to allow pellets to flow from said hopper into said enclosure where the rotation of said paddle wheel propels said pellets through said enclosure outlet, and the deactivation of said solenoid allows said gate to close using gravity.

2. The pellet dispensing apparatus according to claim 1 further comprising a timer circuit for activating said drive means at periodic intervals by connecting said drive means to a power source.

3. The pellet dispensing apparatus according to claim 2 further comprising a delay timer circuit for activating said solenoid to open said gate at said periodic intervals by connecting said solenoid to said power source, wherein said delay timer circuit delays the activation of said solenoid until after said drive means accelerates said paddle wheel to operating speed.

4. The pellet dispensing apparatus according to claim 1 wherein said chute includes a first and second baffle positioned above said gate and a third gate positioned in close proximity to the portion of said gate which blocks said chute.

5. The pellet dispensing apparatus according to claim 1 wherein said drive means comprises a motor.

6. The pellet dispensing apparatus according to claim 1 wherein said drive means rotates said paddle wheel for a brief time period after said gate closes to ensure all pellets within said enclosure are dispensed.

* * * * *